United States Patent
Nakatani et al.

(10) Patent No.: US 8,336,296 B2
(45) Date of Patent: Dec. 25, 2012

(54) EXHAUST GAS PURIFICATION SYSTEM FOR INTERNAL COMBUSTION ENGINE

(75) Inventors: Koichiro Nakatani, Mishima (JP);
Terutoshi Tomoda, Mishima (JP);
Shinobu Ishiyama, Numazu (JP);
Tomoyuki Ono, Sunto-gun (JP);
Tomoyuki Kogo, Gotenba (JP);
Katsuhiro Ito, Mishima (JP);
Masayoshi Nakagawa, Gotenba (JP);
Yoshihiro Hisataka, Fujinomiya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 422 days.

(21) Appl. No.: 12/742,309

(22) PCT Filed: Nov. 11, 2008

(86) PCT No.: PCT/JP2008/070505
§ 371 (c)(1),
(2), (4) Date: May 11, 2010

(87) PCT Pub. No.: WO2009/063866
PCT Pub. Date: May 22, 2009

(65) Prior Publication Data
US 2010/0251697 A1    Oct. 7, 2010

(30) Foreign Application Priority Data

Nov. 13, 2007   (JP) ................. 2007-294609
Jun. 16, 2008   (JP) ................. 2008-156918

(51) Int. Cl.
*F01N 3/00*        (2006.01)
(52) U.S. Cl. ........... 60/286; 60/285; 60/295; 60/299; 60/301

(58) Field of Classification Search .............. 60/274, 60/285–287, 295–301
See application file for complete search history.

(56) References Cited

U.S. PATENT DOCUMENTS

| | | | |
|---|---|---|---|
| 6,006,515 A | 12/1999 | Wakamoto | |
| 7,433,776 B1 * | 10/2008 | Hunter et al. | 701/102 |
| 7,963,103 B2 * | 6/2011 | Nagaoka et al. | 60/286 |
| 2005/0124459 A1 * | 6/2005 | Ito | 477/43 |
| 2005/0223698 A1 * | 10/2005 | Murata et al. | 60/286 |
| 2010/0307132 A1 * | 12/2010 | Yuza et al. | 60/274 |

FOREIGN PATENT DOCUMENTS

JP    A-8-144749    6/1996
(Continued)

OTHER PUBLICATIONS

International Search Report for International Application No. PCT/JP2008/070505, mailed on Feb. 17, 2009.

*Primary Examiner* — Thomas Denion
*Assistant Examiner* — Jesse Bogue
(74) *Attorney, Agent, or Firm* — Oliff & Berridge, PLC

(57) ABSTRACT

An object of the present invention is to provide a technology that enables reduction of NOx stored in an NOx catalyst with improved efficiency in an exhaust gas purification system for an internal combustion engine. According to the present invention, when NOx stored in the NOx catalyst is to be reduced, if the temperature of the NOx catalyst is lower than a specific temperature, the air-fuel ratio of the ambient atmosphere around the NOx catalyst is decreased only by decreasing the air-fuel ratio of the exhaust gas discharged from the internal combustion engine, and if the temperature of the NOx catalyst is not lower than the specific temperature, the air-fuel ratio of the ambient atmosphere around the NOx catalyst is decreased either only by adding reducing agent through reducing agent addition means, or by decreasing the air-fuel ratio of the exhaust gas discharged from the internal combustion engine and adding reducing agent through the reducing agent addition means.

7 Claims, 8 Drawing Sheets

FOREIGN PATENT DOCUMENTS

| | | |
|---|---|---|
| JP | A-2003-148132 | 5/2003 |
| JP | A-2003-328744 | 11/2003 |
| JP | A-2005-226463 | 8/2005 |
| JP | A-2006-29147 | 2/2006 |

* cited by examiner

EXHAUST GAS PURIFICATION SYSTEM FOR INTERNAL COMBUSTION ENGINE

This application is the national phase application under 35 U.S.C. §371 of PCT international application No. PCT/JP2008/070505 filed on 11 Nov. 2008, which claims priority to Japanese patent application No. 2007-294609 filed on 13 Nov. 2007 and Japanese patent application No. 2008-156918 filed on 16 Jun. 2008, the contents of which are incorporated herein by reference.

TECHNICAL FIELD

The present invention relates to an exhaust gas purification system for an internal combustion engine having an NOx storage reduction catalyst provided in an exhaust passage of the internal combustion engine.

BACKGROUND ART

In the case where an NOx storage reduction catalyst (which will be simply referred to as the NOx catalyst hereinafter) is provided in an exhaust passage of an internal combustion engine, NOx stored in the NOx catalyst may be reduced by decreasing the air-fuel ratio of the ambient atmosphere around the NOx catalyst to a target air fuel ratio. Known ways of decreasing the air-fuel ratio of the ambient atmosphere around the NOx catalyst include adding reducing agent to the exhaust gas through a reducing agent addition unit provided in the exhaust passage upstream of the NOx catalyst, and decreasing the air-fuel ratio of the exhaust gas discharged from the internal combustion engine.

Patent document 1 discloses a technology in which when NOx stored in an NOx catalyst is to be reduced, the air-fuel ratio of the exhaust gas is decreased by regulating at least one of the EGR quantity or the intake air quantity, and thereafter the air-fuel ratio of the exhaust gas is further decreased by adding fuel to the exhaust gas.

[Patent Document 1] Japanese Patent Application Laid-Open No. 2005-226463

DISCLOSURE OF THE INVENTION

Problem to be Solved by the Invention

An object of the present invention is to provide a technology that enables efficient reduction of NOx stored in an NOx catalyst in an exhaust gas purification system for an internal combustion engine.

Means for Solving the Problem

In a system according to the present invention, when NOx stored in an NOx catalyst is to be reduced, a determination is made by a reducing agent evaporation determination unit as to whether or not, if reducing agent is added through a reducing agent addition unit, the reducing agent adhering to the NOx catalyst can evaporate in the NOx catalyst. If the determination by the reducing agent evaporation determination unit is negative, the air-fuel ratio of the ambient atmosphere around the NOx catalyst is decreased only by decreasing the air-fuel ratio of the exhaust gas discharged from the internal combustion engine. On the other hand, if the determination by the reducing agent evaporation determination unit is affirmative, the air-fuel ratio of the ambient atmosphere around the NOx catalyst is decreased either only by adding the reducing agent through the reducing agent addition unit, or by decreasing the air-fuel ratio of the exhaust gas discharged from the internal combustion engine and adding the reducing agent through the reducing agent addition unit.

More specifically, an exhaust gas purification system for an internal combustion engine according to the present invention is characterized by comprising:

an NOx storage reduction catalyst provided in an exhaust passage of an internal combustion engine;

a reducing agent addition unit provided in the exhaust passage upstream of said NOx storage reduction catalyst for adding reducing agent to exhaust gas;

an exhaust gas air-fuel ratio control unit for controlling the air-fuel ratio of the exhaust gas discharged from the internal combustion engine;

an NOx reduction unit for reducing NOx stored in said NOx storage reduction catalyst by decreasing the air-fuel ratio of the ambient atmosphere around said NOx storage reduction catalyst to a target air-fuel ratio; and a reducing agent evaporation determination unit for determining whether or not, if the reducing agent is added through said reducing agent addition unit, the reducing agent adhering to said NOx storage reduction catalyst can evaporate in said NOx storage reduction catalyst, wherein when reducing NOx stored in said NOx storage reduction catalyst, if a negative determination is made by said reducing agent evaporation determination unit, said NOx reduction unit decreases the air fuel ratio of the ambient atmosphere around said NOx storage reduction catalyst to said target air-fuel ratio only by decreasing the air-fuel ratio of the exhaust gas discharged from the internal combustion engine by said exhaust gas air-fuel ratio control unit, and if an affirmative determination is made by said reducing agent evaporation determination unit, said NOx reduction unit decreases the air fuel ratio of the ambient atmosphere around said NOx storage reduction catalyst to said target air-fuel ratio either only by adding the reducing agent through said reducing agent addition unit, or by decreasing the air-fuel ratio of the exhaust gas discharged from the internal combustion engine by said exhaust gas air-fuel ratio control unit and adding the reducing agent through said reducing agent addition unit.

In the case where the air-fuel ratio of the exhaust gas discharged from the internal combustion engine is decreased in order to decrease the air-fuel ratio of the ambient atmosphere around the NOx catalyst, fuel that has evaporated in the cylinder(s) is supplied as reducing agent to the NOx catalyst. On the other hand, in the case where the reducing agent is added through the reducing agent addition unit, the reducing agent thus added evaporates in the exhaust gas, but a portion of the reducing agent does not evaporate and reaches the NOx catalyst to adhere to the NOx catalyst. The reducing agent that has once adhered to the NOx catalyst functions as reducing agent after evaporating in the NOx catalyst. However, there may be cases in which the reducing agent that has once adhered to the NOx catalyst hardly evaporates.

In view of this, according to the present invention, when NOx stored in the NOx catalyst is to be reduced, a determination is made by the reducing agent evaporation determination unit as to whether or not the reducing agent added through the reducing agent addition valve and adhering to the NOx catalyst can evaporate in the NOx catalyst. If a negative determination is made by the reducing agent evaporation determination unit, the air-fuel ratio of the ambient atmosphere around the NOx catalyst is decreased to the target air-fuel ratio only by decreasing the air-fuel ratio of the exhaust gas discharged from the internal combustion engine by the exhaust gas air-fuel ratio control unit. Here, the target air-fuel ratio is an air-fuel ratio equal to or lower than the threshold value at which NOx stored in the NOx catalyst can be reduced. The target air-fuel ratio can be determined in advance by, for example, experiments.

When the air-fuel ratio of the exhaust gas discharged from the internal combustion engine has been made lower, the reduction reaction of NOx tends to be promoted because the NOx catalyst is supplied with fuel having been evaporated in the cylinder(s), as described above. Therefore, NOx stored in the NOx catalyst can be reduced more efficiently.

On the other hand, if an affirmative determination is made by the reducing agent evaporation determination unit, the air-fuel ratio of the ambient atmosphere around the NOx catalyst is decreased either only by adding reducing agent through the reducing agent addition unit or by decreasing the air-fuel ratio of the exhaust gas discharged from the internal combustion engine by the exhaust gas air-fuel ratio control unit and adding the reducing agent through the reducing agent addition unit.

In the case where the reducing agent added through the reducing agent addition valve and once adhering to the NOx catalyst functions as reducing agent after evaporating in the NOx catalyst, the time over which the reducing agent is used to reduce NOx is longer than that in the case where reducing agent (or fuel) that has been evaporated beforehand is supplied to the NOx catalyst. Consequently, a larger amount of NOx can be reduced. Therefore, when the reducing agent once adhering to the NOx catalyst can evaporate in the NOx catalyst, NOx stored in the NOx catalyst can be reduced with enhanced efficiency by decreasing the air-fuel ratio of the ambient atmosphere around the NOx catalyst to the target air-fuel ratio by means of the addition of reducing agent through the reducing agent addition unit.

As described above, according to the present invention, NOx stored in the NOx catalyst can be reduced with improved efficiency by selecting the method of reducing NOx based on the result of determination made by the reducing agent evaporation determination unit.

In the system according to the present invention, the reducing agent evaporation determination unit may make a negative determination if the temperature of the NOx storage reduction catalyst is lower than a specific temperature, and make a positive determination if the temperature of the NOx catalyst is equal to or higher than the specific temperature.

Here, the specific temperature is a temperature higher than the lowest temperature at which the reducing agent adhering to the NOx catalyst can evaporate in the NOx catalyst. The specific temperature as such can be determined in advance by, for example, experiments.

When the engine rotational speed of the internal combustion engine is high, the intake air quantity is larger and consequently the flow rate of the exhaust gas is higher than when the engine rotational speed is low. If reducing agent (or fuel) that has already evaporated is supplied to the NOx catalyst, an increase in the flow rate of the exhaust gas tends to lead to an increase in the quantity of the reducing agent slipping through the NOx catalyst without being used to reduce NOx.

In view of this, in the case where the engine rotational speed of the internal combustion engine at the time when NOx stored in the NOx catalyst is to be reduced is high, the specific temperature may be set to a value lower than that in the case where the engine rotational speed is low.

As described above, a portion of the reducing agent added through the reducing agent addition unit does not evaporate in the exhaust gas, and once adheres to the NOx catalyst. In consequence, in the case where reducing agent is added through the reducing agent addition unit, an increase in the flow rate of the exhaust gas hardly leads to an increase in the quantity of the reducing agent slipping through the NOx catalyst.

Therefore, with the above feature, the quantity of the reducing agent slipping through the NOx catalyst as NOx stored in the NOx catalyst is reduced can be reduced. Consequently, NOx stored in the NOx catalyst can be reduced with improved efficiency.

In the system according to the present invention, the reducing agent evaporation determination unit may make a negative determination if the engine load of the internal combustion engine is lower than a first specific load, and make an affirmative determination if the engine load of the internal combustion engine is equal to or higher than the first specific load.

Here, the first specific load is a load at which it may be concluded that the temperature of the NOx catalyst is equal to or higher than the lowest temperature at which the reducing agent adhering to the NOx catalyst can evaporate in the NOx catalyst. The first specific load as such can be determined in advance by, for example, experiments.

In the case where the engine rotational speed of the internal combustion engine at the time when NOx stored in the NOx catalyst is to be reduced is high, the first specific load may be set to a value lower than that in the case where the engine rotational speed is low.

With this feature, the quantity of the reducing agent slipping through the NOx catalyst during the reduction of NOx stored in the NOx catalyst can be made smaller.

The exhaust gas purification system for an internal combustion engine according to the present invention may further comprise a clogging prevention determination unit for determining whether or not a condition for executing clogging prevention addition, which is the addition of reducing agent performed to prevent clogging of the reducing agent addition valve, is met. If this is the case, if the condition for executing the clogging prevention addition is met at the time when NOx stored in the NOx catalyst is to be reduced and a negative determination is made by the reducing agent evaporation determination unit, the air-fuel ratio of the exhaust gas discharged from the internal combustion engine may be decreased by the exhaust gas air-fuel ratio control unit, and the clogging prevention addition may be performed.

In this case, if the air-fuel ratio of the exhaust gas discharged from the internal combustion engine is decreased by the exhaust gas air-fuel ratio control unit to the same extent as in the case where the clogging prevention addition is not performed at the same time, the air-fuel ratio of the ambient atmosphere around the NOx catalyst will become lower than the target air-fuel ratio due to the addition of reducing agent in the clogging prevention addition. In view of this, in the aforementioned case, the amount of decrease in decreasing the air-fuel ratio of the exhaust gas discharged from the internal combustion engine by the exhaust gas air-fuel ratio control unit is made smaller than that in the case where the clogging prevention addition is not performed at the same time.

Then, the increase in fuel consumption can be made smaller than that in the case where the clogging prevention addition is executed at a timing different from the timing of reducing NOx stored in the NOx catalyst.

In the case where the above-described feature is adopted, the clogging prevention determination unit may determine that the condition for executing the clogging prevention addition is met when the time elapsed since the last execution of the clogging prevention addition reaches a first specific time, and the clogging prevention determination unit may also determine that the condition for executing the clogging prevention addition is met when the time elapsed since the last execution of the clogging prevention addition has reached a second specific time that is shorter than the first specific time at the time when NOx stored in the NOx catalyst is to be reduced.

In other words, at the time when NOx stored in the NOx catalyst is to be reduced, the clogging prevention addition is executed, if the elapsed time since the last execution of the clogging prevention addition has reached the second specific time, even if this elapsed time has not reached the first specific time.

Here, the first specific time is a period of time equal to or shorter than a threshold time that allows to conclude that if the suspension of addition of fuel through the fuel addition valve continues longer than the threshold time, it can become difficult to remove clogging of the fuel addition valve. The first specific time as such can be determined in advance by, for example, experiments.

In the case where the air-fuel ratio of the ambient atmosphere around the NOx catalyst is decreased to the target air-fuel ratio by means of the addition of reducing agent through the reducing agent addition unit, the addition of reducing agent through the reducing agent addition unit also serves as the clogging prevention addition. In the case where the air-fuel ratio of the ambient atmosphere around the NOx catalyst is decreased to the target air-fuel ratio only by decreasing the air-fuel ratio of the exhaust gas discharged from the internal combustion engine, the amount of decrease in decreasing the air-fuel ratio of the exhaust gas discharged from the internal combustion engine is made smaller than that in the case where the clogging prevention addition is not performed at the same time, as described above.

According to the above, the frequency of execution of the clogging prevention addition at the timing simultaneous with the reduction of NOx stored in the NOx catalyst increases as compared to that in the case where the clogging prevention addition is executed only at times when the elapsed time since the last execution of the clogging prevention addition reaches the first specific time. Therefore, the fuel economy can further be prevented from being made worse.

In the case where the above-described feature is adopted, execution of the clogging prevention addition may be disabled if the engine load of the internal combustion engine is equal to or lower than a second specific load, even if the condition for executing the clogging prevention addition is met at the time when NOx stored in the NOx catalyst is to be reduced and a negative determination is made by the reducing agent evaporation determination unit.

A decrease in the engine load of the internal combustion engine will lead to a decrease in the temperature of the exhaust gas and the temperature of the wall surface of the exhaust passage. Then, reducing agent added through the reducing agent addition valve will be likely to adhere to the wall surface of the exhaust passage. The second specific load mentioned above is an engine load equal to or higher than a threshold value that allows to conclude that if the clogging prevention addition is performed, the amount of reducing agent added through the fuel addition valve and adhering to the wall surface of the exhaust passage will exceed an allowable amount. The engine load as such can be determined in advance by, for example, experiments.

As the quantity of reducing agent adhering to the wall surface of the exhaust passage when the clogging prevention addition is performed increases, the quantity of reducing agent flowing into the NOx catalyst with the exhaust gas discharged from the internal combustion engine and having a decreased air-fuel ratio decreases. Consequently, when the amount of the reducing agent adhering to the wall surface of the exhaust passage becomes larger than the allowable amount, it becomes difficult to decrease the air-fuel ratio of the ambient atmosphere around the NOx catalyst to the target air-fuel ratio by decreasing the air-fuel ratio of the exhaust gas discharged from the internal combustion engine and executing the clogging prevention addition.

In view of the above, if the engine load of the internal combustion engine is equal to or lower than the second specific load at the time when NOx stored in the NOx catalyst is to be reduced and a negative determination is made by the reducing agent evaporation determination unit, execution of the clogging prevention addition is disabled. Then, the air-fuel ratio of the ambient atmosphere around the NOx catalyst is decreased to the target air-fuel ratio only by controlling the air-fuel ratio of the exhaust gas discharged from the internal combustion engine.

Thus, the air-fuel ratio of the ambient atmosphere around the NOx catalyst can be decreased to the target air-fuel ratio even when the engine load of the internal combustion engine is equal to or lower than the second specific load.

In the system according to the present invention, the target air-fuel ratio may be a first target air fuel ratio, and the system may further comprise an SOx reduction unit for reducing SOx stored in the NOx catalyst by decreasing the air-fuel ratio of the ambient atmosphere around the NOx catalyst to a second target air-fuel ratio and raising the temperature of the NOx catalyst to the target temperature. In this case, when reducing SOx stored in the NOx catalyst, the SOx reduction unit may decrease the air-fuel ratio of the ambient atmosphere around the NOx catalyst to the second target air-fuel ratio only by decreasing the air-fuel ratio of exhaust gas discharged from the internal combustion engine by the exhaust gas air-fuel ratio control unit.

Here, the second target air-fuel ratio is an air fuel ratio equal to or lower than a threshold value at which SOx stored in the NOx catalyst can be reduced. The target temperature is an air-fuel ratio equal to or higher than a threshold value at which SOx stored in the NOx catalyst can be reduced. The second target air-fuel ratio and the target temperature can be determined in advance by, for example, experiments.

Researches conducted by the inventors of the present invention revealed that in the case where SOx stored in the NOx catalyst is reduced, contrary to the case where NOx is reduced, a higher SOx reduction efficiency is achieved by decreasing the air fuel ratio of the ambient atmosphere around the NOx catalyst only by decreasing the air-fuel ratio of the exhaust gas discharged from the internal combustion engine than by adding reducing agent through the reducing agent addition unit even when the reducing agent adhering to the NOx catalyst can evaporate in the NOx catalyst.

The reason for this is considered to be as follows. In the case where the air-fuel ratio of the ambient atmosphere around the NOx catalyst is decreased by the addition of reducing agent through the reducing agent addition unit, the air-fuel ratio of the ambient atmosphere around the NOx catalyst tends to be more inhomogeneous than in the case where the air-fuel ratio of the ambient atmosphere around the NOx catalyst is decreased only by decreasing the air-fuel ratio of the exhaust gas discharged from the internal combustion engine. In the case of reduction of NOx, even if the air-fuel ratio of the ambient atmosphere around the NOx catalyst is inhomogeneous, NOx is reduced into $N_2$ in a region in which the air-fuel ratio is sufficiently low and flows out of the NOx catalyst in the form of $N_2$. In the case of SOx in contrast, even if SOx is released from the NOx catalyst in a region in which the air-fuel ratio is sufficiently low, SOx thus released may be stored into the NOx catalyst again in a region in which the air-fuel ratio is relatively high. In consequence, the efficiency of SOx reduction is deteriorated.

In view of the above, in the case where SOx stored in the NOx catalyst is to be reduced, the air-fuel ratio of the ambient atmosphere around the NOx catalyst is decreased to a second target air-fuel ratio only by decreasing the air-fuel ratio of the exhaust gas discharged from the internal combustion engine by the exhaust gas air-fuel ratio control unit, regardless of whether or not the reducing agent adhering to the NOX catalyst can evaporate in the NOx catalyst. This enables reduction of SOx stored in the NOx catalyst with improved efficiency.

Advantageous Effect of the Invention

In the exhaust gas purification system for an internal combustion engine according to the present invention, NOx stored in the NOx catalyst can be reduced with improved efficiency.

DESCRIPTION OF THE REFERENCE SIGNS

Figure 1:
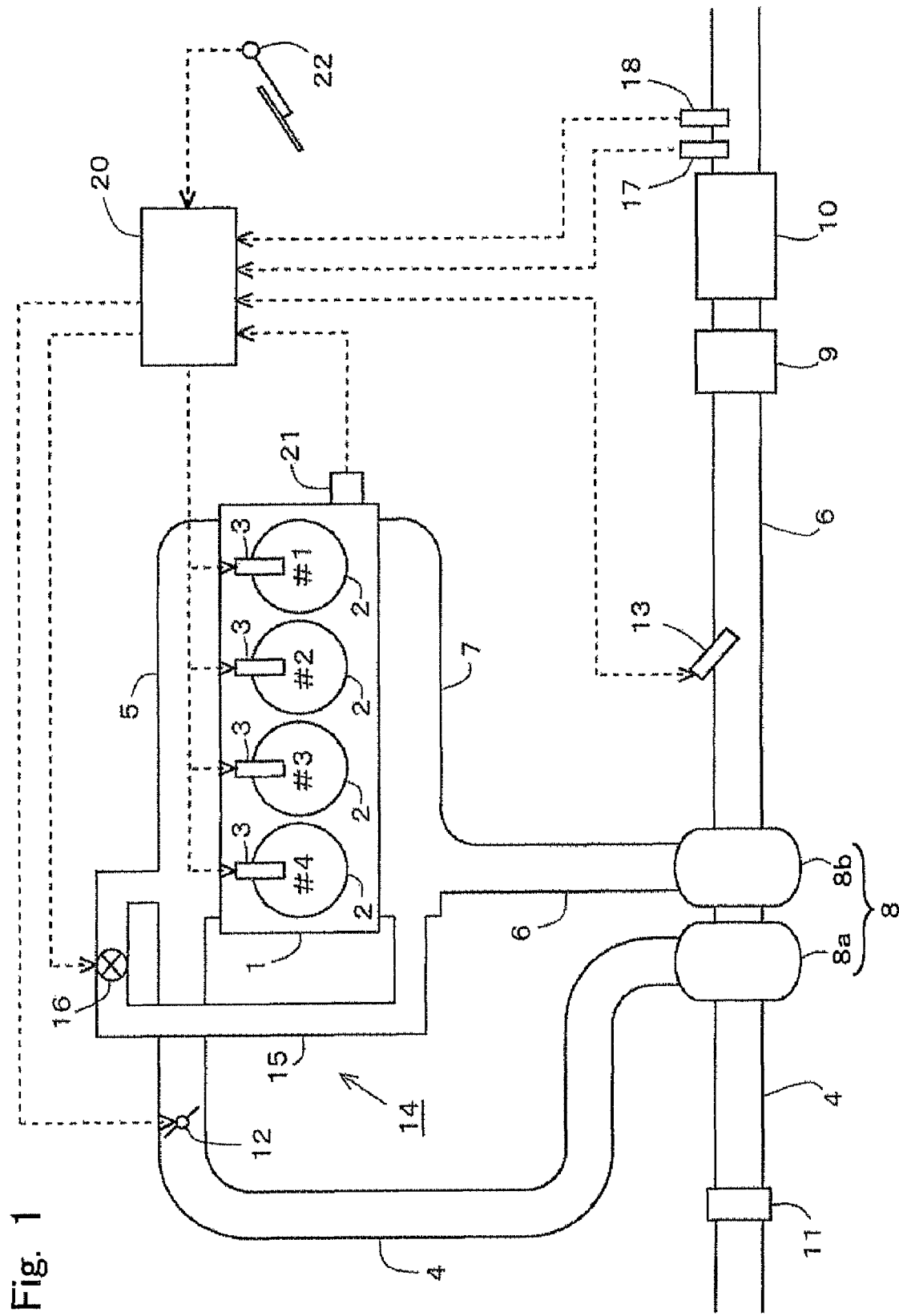
FIG. 1 is a diagram showing the general configuration of an internal combustion engine and its air-intake and exhaust system according to embodiment 1.

1: internal combustion engine
2: cylinder
3: fuel injection valve
4: intake passage
5: intake manifold
6: exhaust passage
7: exhaust manifold
8: turbocharger
8a: compressor housing
8b: turbine housing
9: oxidation catalyst
10: NOx storage reduction catalyst
11: air flow meter
12: throttle valve
13: fuel addition valve
14: EGR apparatus
15: EGR passage
16: EGR valve
17: air-fuel ratio sensor
18: temperature sensor
20: ECU
21: crank position sensor
22: accelerator opening degree sensor

THE BEST MODE FOR CARRYING OUT THE INVENTION

In the following, specific embodiments of the exhaust gas purification system for an internal combustion engine according to the present invention will be described with reference to the drawings.

Embodiment 1

General Configuration of Internal Combustion Engine and Air-Intake and Exhaust System Thereof FIG. 1 is a diagram showing the general configuration of an internal combustion engine according to this embodiment and an air-intake and exhaust system thereof. The internal combustion engine 1 is a diesel engine having four cylinders 2 for driving a vehicle. Each cylinder 2 is equipped with a fuel injection valve 3 that injects fuel directly into the cylinder 2.

The internal combustion engine 1 is connected with an intake manifold 5 and an exhaust manifold 7. One end of an intake passage 4 is connected to the intake manifold 5. One end of an exhaust passage 6 is connected to the exhaust manifold 7.

A compressor housing 8a of a turbocharger 8 is provided in the intake passage 4. A turbine housing 8b of the turbocharger 8 is provided in the exhaust passage 6.

An air flow meter 11 is provided in the intake passage 4 upstream of the compressor housing 8a. A throttle valve 12 is provided in the intake passage 4 downstream of the compressor housing 8a.

An oxidation catalyst 9 is provided in the exhaust passage 6 downstream of the turbine housing 8b. An NOx catalyst 10 is provided in the exhaust passage 6 downstream of the oxidation catalyst 9.

A fuel addition valve 13 that adds fuel as a reducing agent to the exhaust gas is provided in the exhaust passage 6 downstream of the turbine housing 8b and upstream of the oxidation catalyst 9. In this embodiment, the fuel addition valve 13 corresponds to the reducing agent addition unit according to the present invention.

An air-fuel ratio sensor 17 that senses the air-fuel ratio of the exhaust gas and a temperature sensor 18 that senses the temperature of the exhaust gas are provided in the exhaust passage 6 downstream of the NOx catalyst 10.

The internal combustion engine 1 according to this embodiment is provided with an EGR apparatus 14 that introduces a portion of the exhaust gas into the intake system as the EGR gas. The EGR apparatus 14 includes the EGR passage 15 and the EGR valve 16. One end of the EGR passage 15 is connected to the exhaust manifold 7, and the other end thereof is connected to the intake manifold 5. The EGR gas is introduced from the exhaust manifold 7 into the intake manifold 5 through the EGR passage 15. The EGR valve 16 is provided in the EGR passage 15. The quantity of the EGR gas introduced into the intake manifold 5 is regulated by the EGR valve 16.

An electronic control unit (ECU) 20 that controls the operation state of the internal combustion engine 1 is annexed to the internal combustion engine 1. The ECU 20 is electrically connected with the air flow meter 11, the air-fuel ratio sensor 17, the temperature sensor 18, a crank position sensor 21, and the accelerator opening degree sensor 22. The crank position sensor 21 senses the crank angle of the internal combustion engine 1. The accelerator opening degree sensor 22 senses the opening degree of the accelerator of the vehicle on which the internal combustion engine 1 is mounted. Output signals of the sensors are input to the ECU 20.

The ECU 20 computes the engine rotational speed of the internal combustion engine 1 based on the measurement value of the crank position sensor 21. The ECU 20 also computes the engine load of the internal combustion engine 1 based on the measurement value of the accelerator opening degree sensor 22. The ECU 20 also computes the temperature of the NOx catalyst 10 based on the measurement value of the temperature senor 18. The ECU 20 also computes the air-fuel ratio of the exhaust gas flowing into the NOx catalyst 10, i.e.

the air-fuel ratio of the ambient atmosphere around the NOx catalyst 10 based on the measurement value of the air-fuel ratio sensor 17.

The ECU 20 is also electrically connected with the fuel injection valves 3, the throttle valve 12, the fuel addition valve 13, and the EGR valve 16. They are controlled by the ECU 20.

<NOx Reduction Control>

In this embodiment, an NOx reduction control by which NOx stored in the NOx catalyst 10 is reduced is performed. In order to reduce NOx stored in the NOx catalyst 10, it is necessary that the air-fuel ratio of the ambient atmosphere around the NOx catalyst 10 be decreased to a target NOx reduction air-fuel ratio at which the reduction of NOx is possible. The NOx reduction control according to this embodiment is performed by a rich spike control in which the air-fuel ratio of the ambient atmosphere around the NOx catalyst 10 is decreased to the target NOx reduction air-fuel ratio repeatedly at relatively short intervals. In this embodiment, the target NOx reduction air-fuel ratio corresponds to the target air fuel ratio or the first target air-fuel ratio according to the present invention.

One method of decreasing the air-fuel ratio of the ambient atmosphere around the NOx catalyst 10 is decreasing the air-fuel ratio of the exhaust gas discharged from the internal combustion engine 1 (which method will be herein after referred to as the "combustion rich"), and another method is adding fuel through the fuel addition valve 13 (which method will be hereinafter referred to as the "exhaust addition rich").

Here, specific combustion rich methods may include, for example, decreasing the intake air quantity by the throttle valve 12, increasing the quantity of the EGR gas introduced into the intake manifold 5 by the EGR valve 16, performing sub fuel injection by the fuel injection valve 3 at such a time posterior to the main fuel injection that the supplied fuel is burned, and retarding the timing of fuel injection by the fuel injection valve 3. As above, the combustion rich can be achieved by controlling at least any one of the throttle valve 12, the EGR valve 16, and the fuel injection valve 3 by the ECU 20. In this embodiment, the ECU 20 that realizes the combustion rich corresponds to the exhaust gas air-fuel ratio control unit according to the present invention.

Figure 2:
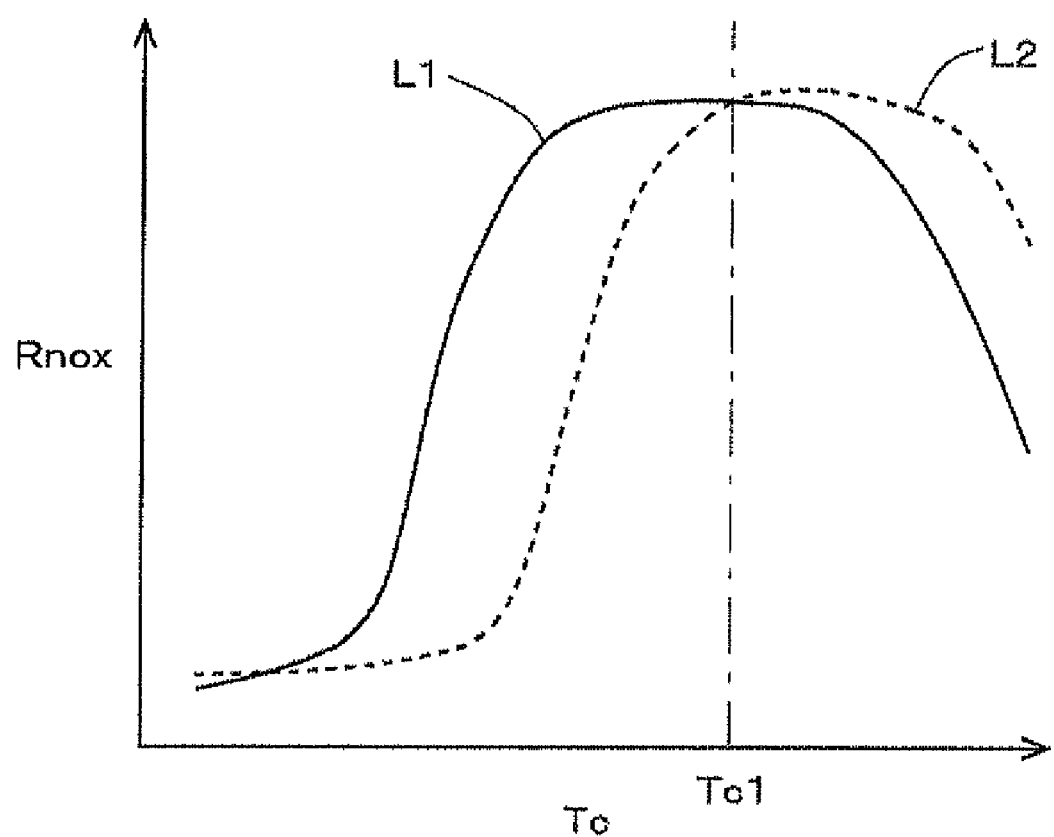
FIG. 2 is a graph showing the relation between the temperature of the NOx catalyst and the NOx reduction ratio in cases where the NOx reduction control is performed by the combustion rich or the exhaust addition rich.

In this embodiment, the combustion rich or the exhaust addition rich is appropriately selected when the NOx reduction control is performed. In the following, how this selection is made will be described with reference to FIG. 2. FIG. 2 is a graph showing the relation between the temperature of the NOx catalyst 10 and the NOx reduction ratio in cases where the NOx reduction control is performed by the combustion rich or the exhaust addition rich. Here, the "NOx reduction ratio" refers to the ratio of the quantity of reduced NOx to the quantity of NOx stored in the NOx catalyst 10. In FIG. 2, the vertical axis represents the NOx reduction ratio Rnox, and the horizontal axis represents the temperature Tc of the NOx catalyst. The solid curve L1 is for the case in which the NOx reduction control is performed by the combustion rich, and the broken curve L2 is for the case in which the NOx reduction control is performed by the exhaust addition rich.

In the case where the air-fuel ratio of the ambient atmosphere around the NOx catalyst 10 is decreased by performing the combustion rich, fuel having evaporated in the cylinder 2 is supplied to the NOx catalyst 10. On the other hand, in the case where the air-fuel ratio of the ambient atmosphere around the NOx catalyst 10 is decreased by performing the exhaust addition rich, a portion of the fuel added through the fuel addition valve 13 evaporates in the exhaust gas, but another portion does not evaporate and reaches the NOx catalyst 10 to adhere to the NOx catalyst 10. The fuel adhering to the NOx catalyst 10 does not function, as it is, as reducing agent to reduce NOx.

Therefore, when the temperature of the NOx catalyst 10 is relatively low at the time when the NOx reduction control is performed, the reduction of NOx tends to be promoted more greatly in the case where the NOx reduction control is performed by the combustion rich than in the case where the NOx reduction control is performed by the exhaust addition rich. In other words, when the temperature of the NOx catalyst 10 is relatively low at the time when the NOx reduction control is performed, a higher NOx reduction ratio is achieved in the case where the NOx reduction control is performed by the combustion rich than in the case where the NOx reduction control is performed by the exhaust addition rich, as shown in FIG. 2.

On the other hand, in the case where the exhaust addition rich is performed at a time when the temperature of the NOx catalyst 10 is relatively high, the fuel added through the fuel addition valve 13 and once adhering to the NOx catalyst 10 evaporates in the NOx catalyst 10. The evaporated fuel functions as reducing agent to reduce NOx. In this case, the time over which fuel is used to reduce NOx is longer than that in the case where fuel that has been evaporated beforehand is supplied to the NOx catalyst 10.

Therefore, in the case where the temperature of the NOx catalyst 10 at the time when the NOx reduction control is performed is relatively high, a larger amount of NOx can be reduced in the ease where the NOx reduction control is performed by the exhaust addition rich than in the case where the NOx reduction control is performed by the combustion rich. In other words, when the temperature of the NOx catalyst 10 is relatively high at the time when the NOx reduction control is performed, a higher NOx reduction ratio is achieved in the case where the NOx reduction control is performed by the exhaust addition rich than in the case where the NOx reduction control is performed by the combustion rich, as shown in FIG. 2.

In view of this, in this embodiment, if the temperature Tc of the NOx catalyst 10 at the time when the NOx reduction control is performed is lower than a specific temperature Tc1, the NOx reduction control is performed by the combustion rich. On the other hand, if the temperature Tc of the NOx catalyst 10 at the time when the NOx reduction control is performed is not lower than a specific temperature Tc1, the NOx reduction control is performed by the exhaust addition rich.

Here, the specific temperature Tc1 is the lowest temperature at which the fuel adhering to the NOx catalyst 10 can evaporate in the NOx catalyst 10. The specific temperature Tc1 as such can be determined in advance by, for example, experiments. The specific temperature Tc1 may be set to a temperature higher than the lowest temperature at which the fuel adhering to the NOx catalyst 10 can evaporate in the NOx catalyst 10.

Thus, according to this embodiment, if it can be concluded that it is difficult for the fuel added through the fuel addition valve 13 and adhering to the NOx catalyst 10 to evaporate in the NOx catalyst 10, the NOx reduction control is performed by the combustion rich. On the other hand, if it can be concluded that it is possible for the fuel added through the fuel addition valve 13 and adhering to the NOx catalyst 10 to evaporate in the NOx catalyst 10, the NOx reduction control is performed by the exhaust addition rich.

By selecting the method of performing the NOx reduction control in this way, NOx stored in the NOx catalyst 10 can be always reduced with higher efficiency. Consequently, the fuel economy can be prevented from being made worse with the execution of the NOx reduction control.

Figure 3:
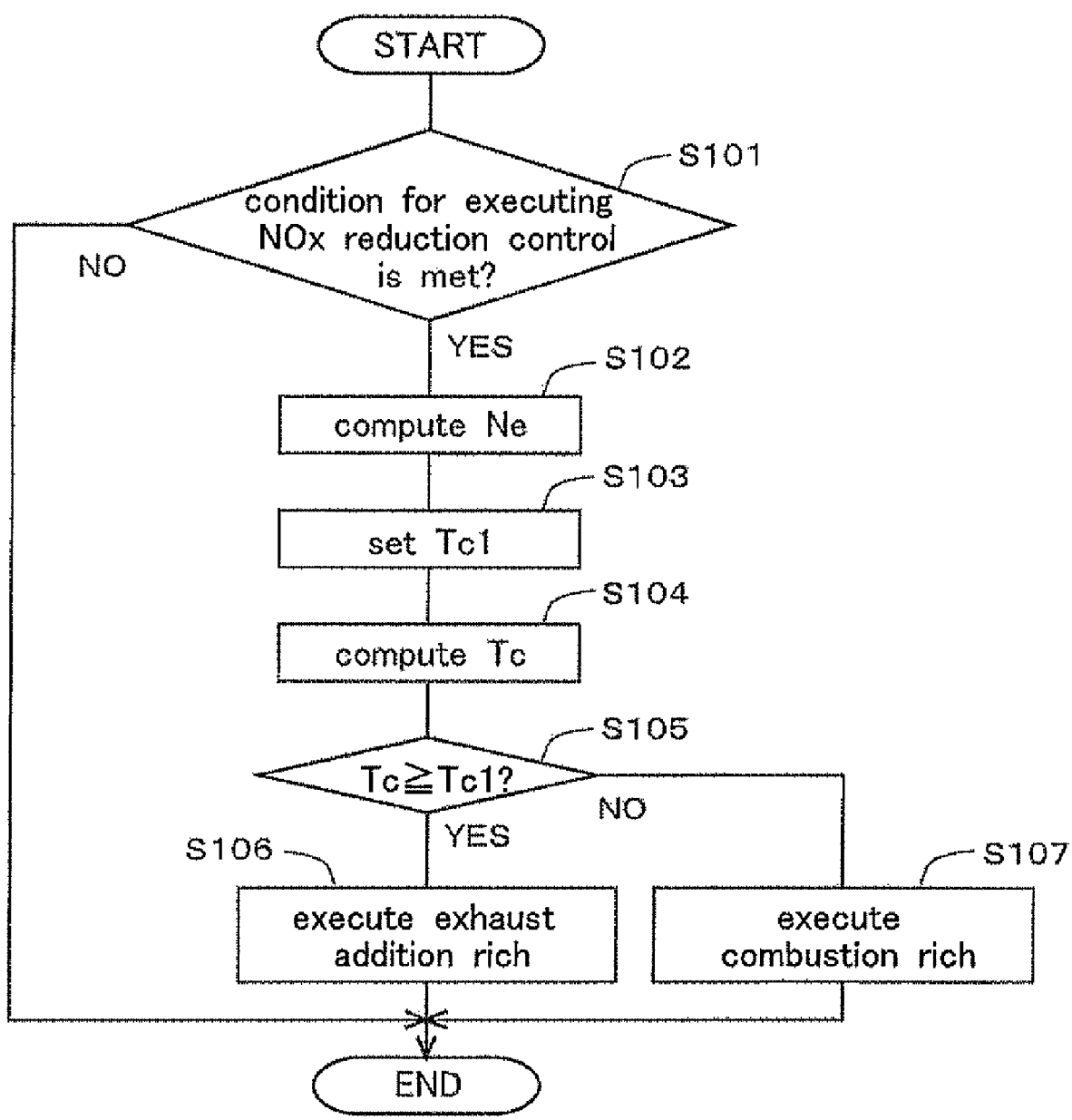
FIG. 3 is a flow chart of a routine of an NOx reduction control according to embodiment 1.

Here, the routine of the NOx reduction control according to this embodiment will be described with reference to the flow chart shown in FIG. 3. This routine is stored in the ECU 20 in advance and executed repeatedly at predetermined intervals while the internal combustion engine 1 is operating. In this embodiment, the ECU 20 that executes this routine corresponds to the NOx reduction unit according to the present invention.

In this routine, first in step S101, the ECU 20 determines whether or not a condition for executing the NOx reduction control is met. Here, the condition for executing the NOx reduction control may be, for example, that a specific time has elapsed since the last execution of the NOx reduction control, or that the integrated amount of the injected fuel quantity in the internal combustion engine 1 since the last execution of the NOx reduction control reaches a specific amount. If the determination in step S101 is affirmative, the ECU 20 proceeds to step S102, and if the determination is negative, the ECU 20 once terminates execution of this routine.

In step S102, the ECU 20 computes the engine rotational speed Ne of the internal combustion engine 1.

Then, the ECU 20 proceeds to step S103, where it sets a specific temperature Tc1 based on the engine rotational speed Ne of the internal combustion engine 1. Here, the higher the engine rotational speed Ne of the internal combustion engine 1 is, the lower the value set as the specific temperature Tc1 is made. The relation between the engine rotational speed Ne of the internal combustion engine 1 and the specific temperature Tc1 is stored in advance as a map in the ECU 20.

Then, the ECU 20 proceeds to step S104, where it computes the temperature Tc of the NOx catalyst 10.

Then, the ECU 20 proceeds to step S105, where it determines whether or not the temperature Tc of the NOx catalyst 10 is equal to or higher than the specific temperature Tc1. If the determination in step S105 is affirmative, the ECU 20 proceeds to step S106, and if the determination is negative, the ECU 20 proceeds to step S107. In this embodiment, the ECU 20 that executes step S105 corresponds to the reducing agent evaporation determination unit according to the present invention.

In step S106, the ECU 20 executes the exhaust addition rich. Thereafter, the ECU 20 once terminates execution of this routine.

On the other hand, in step S107, the ECU 20 executes the combustion rich. Thereafter, the ECU 20 once terminates execution of this routine.

According to the above-described routine, the method of executing the NOx reduction control is selected based on the temperature Tc of the NOx catalyst 10 at the time of execution of the NOx reduction control.

According to the above-described routine, the specific temperature Tc1 is determined based on the engine rotational speed Ne of the internal combustion engine 1. The higher the engine rotational speed Ne of the internal combustion engine 1 is, the larger the flow rate of the exhaust gas is. When fuel that has already evaporated is supplied to the NOx catalyst 10 as is the case with the combustion rich, an increase in the flow rate of the exhaust gas tends to lead to an increase in the quantity of the fuel slipping through the NOx catalyst 10 without being used to reduce NOx. An increase in the quantity of the fuel slipping through the NOx catalyst 10 leads to a decrease in the NOx reduction ratio.

On the other hand, in the case of the exhaust addition rich, a portion of the fuel added through the fuel addition valve 13 adheres to the NOx catalyst 10 without evaporating in the exhaust gas. Therefore, the quantity of the fuel slipping through the NOx catalyst 10 hardly increases even if the flow rate of the exhaust gas is large.

In consequence, the larger the flow rate of the exhaust gas is, the lower the temperature of NOx catalyst 10 that serves as a threshold value that allows to conclude that a higher NOx reduction ratio is achieved in the case where the NOx reduction control is performed by the exhaust addition rich than in the case where the NOx reduction control is performed by the combustion rich is. In view of the above, in this embodiment, the higher the engine rotational speed Ne of the internal combustion engine 1 is, the lower the value set as the specific temperature Tc1 is made.

Thus, the quantity of the reducing agent slipping through the NOx catalyst 10 while the NOx reduction control is performed can be decreased. In consequence, NOx stored in the NOx catalyst 10 can be reduced more efficiently.

In this embodiment, in the case where the temperature Tc of the NOx catalyst 10 is equal to or higher than the specific temperature Tc1 at the time when the NOx reduction control is to be performed, the air-fuel ratio of the ambient atmosphere of the NOx catalyst 10 may be decreased to the target air-fuel ratio by performing the combustion rich and the exhaust addition rich at the same time. In this case also, a portion of the fuel added through the fuel addition valve 13 once adheres to the NOx catalyst 10. Then, the adhering fuel evaporates and functions as reducing agent. Therefore, NOx can be reduced more efficiently than in the case where the NOx reduction control is performed only by the combustion rich.

Embodiment 2

The general configuration of the internal combustion engine and its air-intake and exhaust system according to this embodiment is the same as that in embodiment 1.

<NOx Reduction Control>

In this embodiment, when the NOx reduction control is performed, either the combustion rich or the exhaust addition rich is selected based on the engine load of the internal combustion engine 1. More specifically, if the engine load Qe of the internal combustion engine 1 at the time when the NOx reduction control is to be performed is lower than a first specific load Qe1, the NOx reduction control is performed by the combustion rich. On the other hand, if the engine load Qe of the internal combustion engine 1 at the time when the NOx reduction control is to be performed is not lower than the first specific load Qe1, the NOx reduction control is performed by the exhaust addition rich.

Here, the first specific load Qe1 is an engine load at which it may be concluded that the NOx catalyst 10 is at the lowest temperature at which fuel adhering to the NOx catalyst 10 can evaporate in the NOx catalyst 10. The first specific temperature as such can be determined in advance by, for example, experiments. The first specific load Qe1 may be set to an engine load at which it can concluded that the temperature of the NOx catalyst 10 is higher than the lowest temperature at which fuel adhering to the NOx catalyst 10 can evaporate in the NOx catalyst 10.

With this selection between the combustion rich and the exhaust addition rich that is made based on the engine load of the internal combustion engine 1, if it can be concluded that it is difficult for the fuel added through the fuel addition valve 13 and adhering to the NOx catalyst 10 to evaporate in the NOx catalyst 10, the NOx reduction control is performed by the combustion rich, as is the case with embodiment 1. On the other hand, if it can be concluded that it is possible for the fuel added through the fuel addition valve 13 and adhering to the NOx catalyst 10 to evaporate in the NOx catalyst 10, the NOx reduction control is performed by the exhaust addition rich.

Therefore, in this embodiment also, NOx stored in the NOx catalyst 10 can be always reduced with higher efficiency. Consequently, the fuel economy can be prevented from being made worse with the execution of the NOx reduction control.

Figure 4:
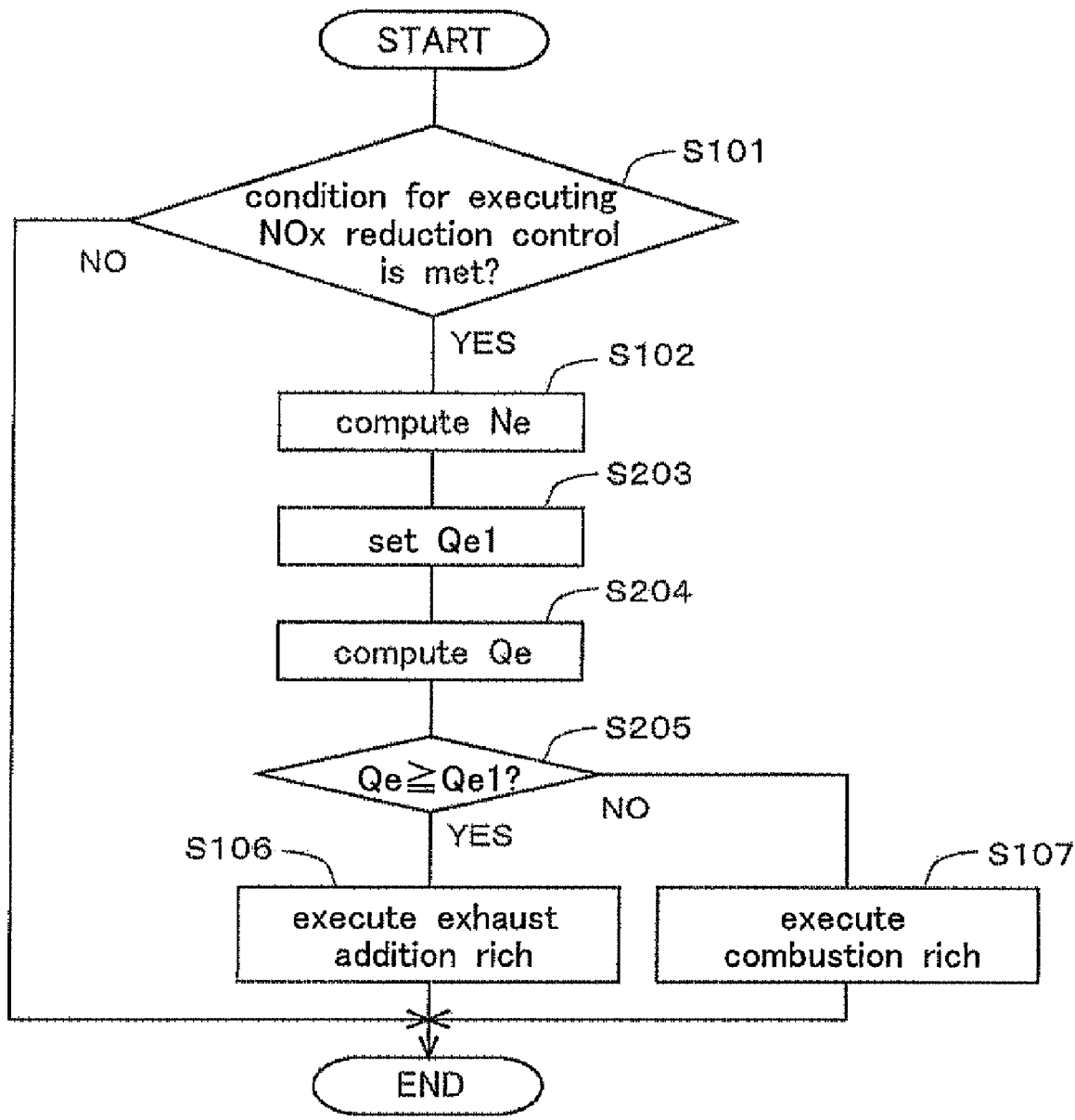
FIG. 4 is a flow chart of a routine of an NOx reduction control according to embodiment 2.

Here, a routine of the NOx reduction control according to the embodiment will be described with reference to the flow chart shown in FIG. 4. This routine is stored in the ECU 20 in advance and executed repeatedly at regular intervals while the internal combustion engine 1 is operating. The flow chart shown in FIG. 4 is the same as the flow chart shown in FIG. 3 except for the replacement of steps S103 to S105 with steps S203 to S205. Therefore, only these steps will be described, and descriptions of the other steps will be omitted. In this embodiment, the ECU 20 that executes this routine corresponds to the NOx reduction unit according to the present invention.

In this routine, after step S102 the ECU 20 proceeds to step S203. In step S203, the ECU 20 sets the first specific load Qe1 based on the engine rotational speed of the internal combustion engine 1. Here, the higher the engine rotational speed of the internal combustion engine 1 is, the lower the set value of the first specific load Qe1 is made. The relation between the engine rotational speed Ne of the internal combustion engine and the first specific load Qe1 is stored beforehand as a map in the ECU 20.

Then, the ECU 20 proceeds to step S204, where it computes the engine load Qe of the internal combustion engine 1.

Then, the ECU 20 proceeds to step S205, where it determines whether or not the engine load Qe of the internal combustion engine 1 is equal to or higher than the first specific load Qe 1. If the determination in step S205 is affirmative, the ECU 20 proceeds to step S106, and if the determination is negative, the ECU 20 proceeds to step S107. In this embodiment, the ECU 20 that executes step S205 corresponds to the reducing agent evaporation determination unit according to the present invention.

According to the above-described routine, the method of performing the NOx reduction control is selected based on the engine load Qe of the internal combustion engine 1 at the time when the NOx reduction control is executed.

Furthermore, according to the above-described routine, the first specific load Qe1 is set based on the engine rotational speed Ne of the internal combustion engine 1. For the reason similar to that explained in the description of the first embodiment, the larger the flow rate of the exhaust gas is, the lower the value of the engine load of the internal combustion engine 1 that serves as a threshold value that allows to conclude that a higher NOx reduction ratio is achieved in the case where the NOx reduction control is performed by the exhaust addition rich than in the case where the NOx reduction control is performed by the combustion rich is. Therefore, in this embodiment, the higher the engine rotational speed Ne of the internal combustion engine 1 is, the lower the set value of the first specific load Qe1 is made.

Thus, the quantity of the reducing agent slipping through the NOx catalyst 10 while the NOx reduction control is performed can be decreased. In consequence, NOx stored in the NOx catalyst 10 can be reduced more efficiently.

In this embodiment, in the case where the engine load Qe of the internal combustion engine 1 is equal to or higher than the first specific load Qe1 at the time when the NOx reduction control is to be performed, the air-fuel ratio of the ambient atmosphere of the NOx catalyst 10 may be decreased to the target air-fuel ratio for NOx reduction by performing the combustion rich and the exhaust addition rich at the same time. In this case also, a portion of the fuel added through the fuel addition valve 13 once adheres to the NOx catalyst 10. Then, the adhering fuel evaporates and functions as reducing agent. Therefore, NOx can be reduced more efficiently than in the case where the NOx reduction control is performed only by the combustion rich.

Embodiment 3

The general configuration of the internal combustion engine and its air-intake and exhaust system according to this embodiment is the same as that in embodiment 1. In this embodiment also, an NOx reduction control is performed in the same manner as that in embodiment 1.

<Clogging Prevention Addition>

In this embodiment, clogging prevention addition in which a very small quantity of fuel is added through the fuel addition valve 13 to prevent dogging of the fuel addition valve 13 is performed. The clogging prevention addition is performed every time a first specific time Δt1 elapses while the internal combustion engine 1 is operating.

Here, the first specific time Δt1 is a threshold value that allows to conclude that if the suspension of addition of fuel through the fuel addition valve 13 continues longer than the first specific time Δt1, it can become difficult to remove clogging of the fuel addition vale 13. The first specific time Δt1 as such can be determined in advance by, for example, experiments. The first specific time Δt1 may be set to a time shorter than the threshold value that allows to conclude that it can become difficult to remove clogging of the fuel addition vale 13. The quantity of fuel added through the fuel addition valve 13 when the clgging prevention addition is performed is determined in advance.

<NOx Reduction Control>

In this embodiment, there may be cases in which the time at which the clogging prevention addition is to be performed comes at the time when the condition for executing the NOx reduction control is met. Then, in the case where the NOx reduction control is performed by the exhaust addition rich, the addition of fuel through the fuel addition valve 13 performed to reduce the ambient atmosphere around the NOx catalyst 10 will serve also as the clogging prevention addition.

On the other hand, in the case where the NOx reduction control is performed by the combustion rich, if the clogging prevention addition is performed in a state in which the air-fuel ratio of the exhaust gas discharged from the internal combustion engine 1 has been lowered to the same extent as in the case where the clogging prevention addition is not performed at the same time, the air-fuel ratio of the ambient atmosphere around the NOx catalyst 10 will become lower than the target air-fuel ratio. In view of this, in the aforementioned case, the amount of decrease in decreasing the air-fuel ratio of the exhaust gas discharged from the internal combustion engine 1 by the combustion rich is made smaller than that in the case where the clogging prevention addition is not performed at the same time, and the combustion rich and the clogging prevention addition are performed at the same time.

Figure 5:
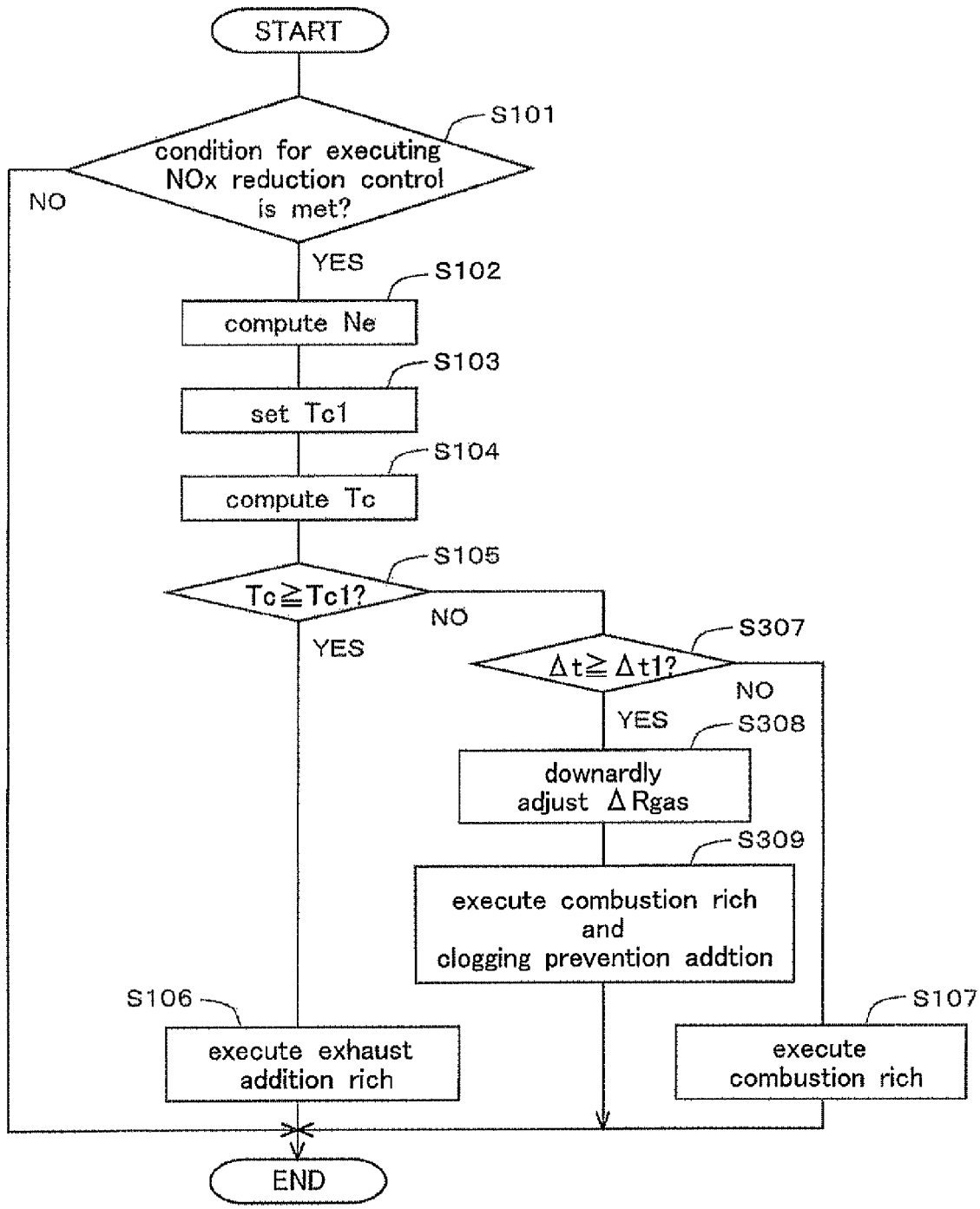
FIG. 5 is a flow chart of a routine of an NOx reduction control according to embodiment 3.

A routine of the NOx reduction control according to this embodiment will be described with reference to the flow chart shown in FIG. 5. This routine is stored in the ECU 20 in advance and executed repeatedly at predetermined intervals while the internal combustion engine 1 is operating. The flow chart shown in FIG. 5 is the same as the flow chart shown in FIG. 3 except for the addition of steps S307 to S309. Therefore, only these steps will be described, and descriptions of the other steps will be omitted. In this embodiment, the ECU 20 that executes this routine corresponds to the NOx reduction unit according to the present invention.

In this routine, if the determination in step S105 is negative, the ECU 20 proceeds to step S307. In step S307, the ECU 20 determines whether or not the elapsed time Δt since the last execution of the clogging prevention addition is equal to or longer than the first specific time Δt1. If the determination in step S307 is affirmative, the ECU 20 proceeds to step S308, and if the determination is negative, the ECU 20 proceeds to step S107. In this embodiment, the ECU 20 that executes step S307 is included in the clogging prevention determination unit according to the present invention.

In step S308, the ECU 20 downwardly adjusts the amount of decrease ΔRgas in the air-fuel ratio of the exhaust gas discharged from the internal combustion engine 1 at the time when the combustion rich is performed in the later-described step S309, to an extent corresponding to the quantity of fuel added through the fuel addition valve 13 as the clogging prevention addition.

Then, the ECU 20 proceeds to step S309, where it executes the combustion rich and the clogging prevention addition. Thereafter, the ECU 20 once terminates execution of this routine.

In this embodiment, in cases where the time at which the clogging prevention addition is to be performed comes during the time when the NOx reduction control is to be performed by the combustion rich, the combustion rich and the clogging prevention addition are performed at the same time. Then, the fuel added through the fuel addition valve 13 as the clogging prevention addition is supplied to the NOx catalyst 10 as the reducing agent for reducing NOx. In addition, even when the combustion rich and the clogging prevention addition are performed at the same time, an excessive decrease in the ambient atmosphere around the NOx catalyst 10 can be prevented. Consequently, the fuel economy can be prevented from being made worse as compared to the case in which the NOx reduction control by the combustion rich and the clogging prevention addition are performed at different times.

The method of determining the time to perform the clogging prevention addition and the method of performing the combustion rich and the clogging prevention addition at the same time according to this embodiment can also be applied to the NOx reduction control according to embodiment 2.

<Modification 1>

Next, a first modification of the embodiment will be described. In this modification, the clogging prevention addition is performed every time the first specific time Δt1 elapses while the internal combustion engine 1 is operating, as with the above described case. In this embodiment, furthermore, when the NOx reduction control is to be performed, the clogging prevention addition is performed also if the elapsed time Δt since the last execution of the clogging prevention addition has reached a second specific time Δt2 that is shorter than the first specific time Δt1.

In this case also, in the case where the NOx reduction control is performed by the exhaust addition rich, the addition of fuel through the fuel addition valve 13 performed in order to decrease the ambient atmosphere around the NOx catalyst 10 will serve also as the clogging prevention addition.

On the other hand, in the case where the NOx reduction control is performed by the combustion rich, the amount of decrease in the air-fuel ratio of the exhaust gas discharged from the internal combustion engine 1 during the combustion rich is made smaller than in the case where the clogging prevention addition is not performed at the same time, and the combustion rich and the clogging prevention addition are performed at the same time.

With this control, the chance that the clogging prevention addition is performed at the time when the NOx reduction control is performed is increased as compared to the case where the clogging prevention addition is performed only when the elapsed time Δt since the last execution of the clogging prevention addition reaches the first specific time Δt1 Therefore, the chance that the fuel added through the fuel addition valve as the clogging prevention addition contributes to the reduction of NOx increases. Therefore, the fuel economy can further be prevented from being made worse.

Figure 6:
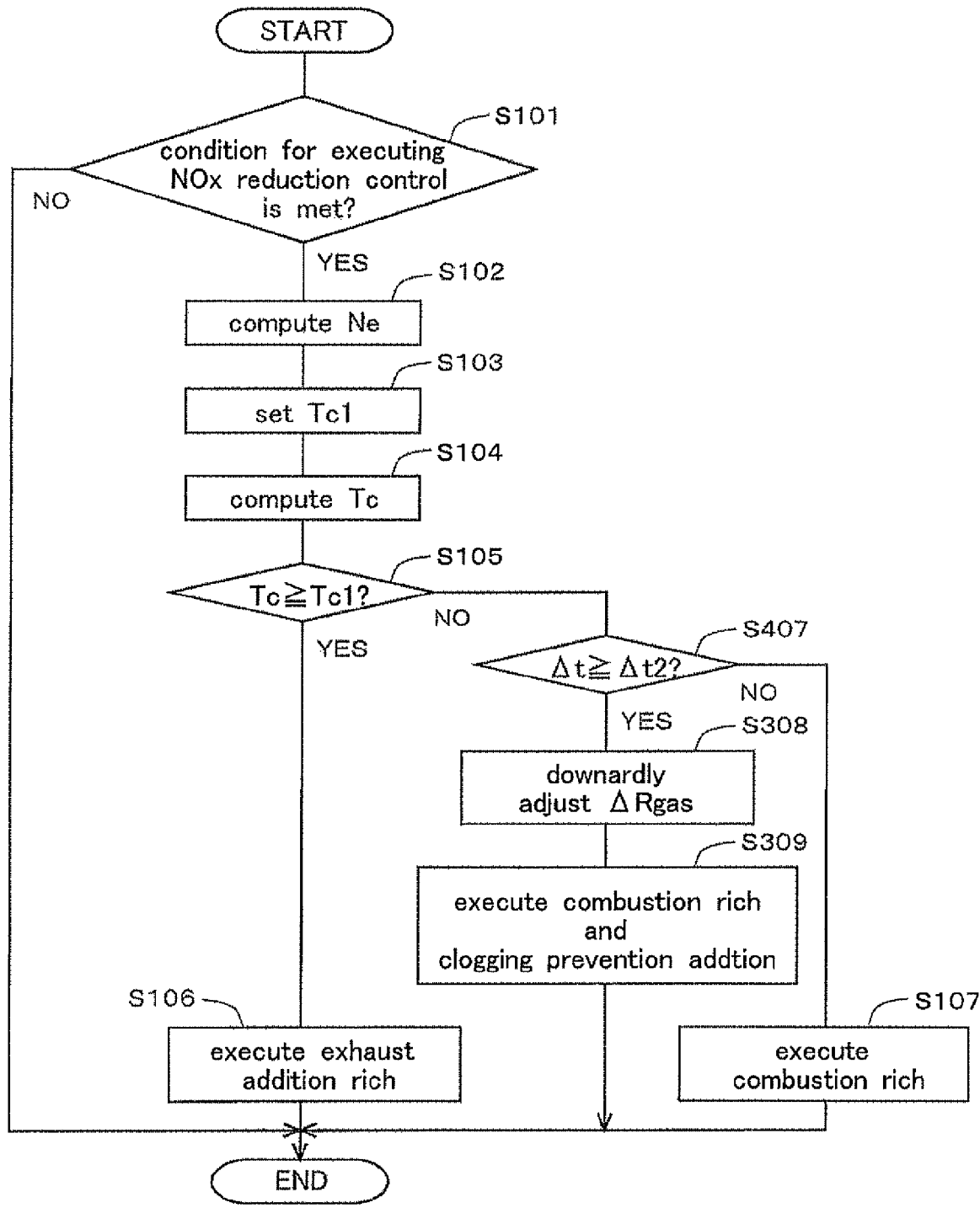
FIG. 6 is a flow chart of a routine of an NOx reduction control according to a first modification of embodiment 3.

In the following, a routine of the NOx reduction control according to the modification will be described with reference to the flow chart shown in FIG. 6. This routine is stored in the ECU 20 in advance and executed repeatedly at predetermined intervals while the internal combustion engine 1 is operating. The flow chart shown in FIG. 6 is the same as the flow chart shown in FIG. 5 except for the replacement of step S307 with step S407. Therefore, only step S407 will be described, and descriptions of the other steps will be omitted.

In this routine, if the determination in step S105 is negative, the ECU 20 proceeds to step S407. In step S407, the ECU 20 determines whether or not the elapsed time Δt since the last execution of the clogging prevention addition is equal to or higher than the second specific time Δt2. If the determination in step S407 is affirmative, the ECU 20 proceeds to step S308, and if the determination is negative, the ECU 20 proceeds to step S107. In this embodiment, the ECU 20 that executes step S407 is included in the clogging prevention determination unit according to the present invention.

<Modification 2>

Next, a second modification of the embodiment will be described. In this modification also, the clogging prevention addition is performed every time the first specific time Δt1 elapses while the internal combustion engine 1 is operating. However, in this embodiment, even when the elapsed time Δt since the last execution of the clogging prevention addition has reached the first specific time Δt1 at the time when the NOx reduction control is to be performed by the combustion rich, the execution of the clogging prevention addition is disabled if the engine load Qe of the internal combustion engine 1 is equal to or lower than a second specific load Qe2.

Here, the second specific load Qe2 is a threshold value that allows to conclude that if the clogging prevention addition is performed, the quantity of fuel added through the fuel addition valve 13 and adhering to the wall surface of the exhaust passage 6 will exceed an allowable quantity. The engine load as such can be determined in advance by, for example, experiments. The second specific load Qe2 may be set to an engine load that is higher than the threshold value that allows to conclude that if the clogging prevention addition is performed, the quantity of fuel added through the fuel addition valve 13 and adhering to the wall surface of the exhaust passage 6 will exceed an allowable quantity.

As described above, in the case where the combustion rich and the clogging prevention addition are performed at the same time, the amount of decrease ΔRgas in the air-fuel ratio of the exhaust gas discharged from the internal combustion engine 1 during the time when the combustion rich is performed is downwardly adjusted to an extent corresponding to the quantity of fuel added through the fuel addition valve 13 as the clogging prevention addition. However, if the engine load of the internal combustion engine 1 is equal to or lower than the second specific load Qe, even when the combustion rich and the clogging prevention addition are performed at the same time, it is difficult to reduce the air-fuel ratio of the ambient atmosphere around the NOx catalyst 10 to the target NOx reduction air-fuel ratio, because the quantity of fuel flowing into the NOx catalyst 10 with the exhaust gas having an air-fuel ratio decreased by the combustion rich is small.

In view of this, in this embodiment, even when the time to perform the clogging prevention addition comes at the time when the NOx reduction control is to be performed by the combustion rich, the execution of the clogging prevention addition is disabled if the engine load Qe of the internal combustion engine 1 is equal to or lower than the second specific load Qe2. Then, only the NOx reduction control by the combustion rich is performed. In this case, the air-fuel ratio of the ambient atmosphere around the NOx catalyst 10 is decreased to the target air-fuel ratio for NOx reduction only by the combustion rich.

Thus, the air-fuel ratio of the ambient atmosphere around the NOx catalyst 10 can be decreased to the target air-fuel ratio for NOx reduction even when the engine load of the internal combustion engine 1 is equal to or lower than the second specific load Qe2. Therefore, NOx stored in the NOx catalyst 10 can be reduced sufficiently.

Figure 7:
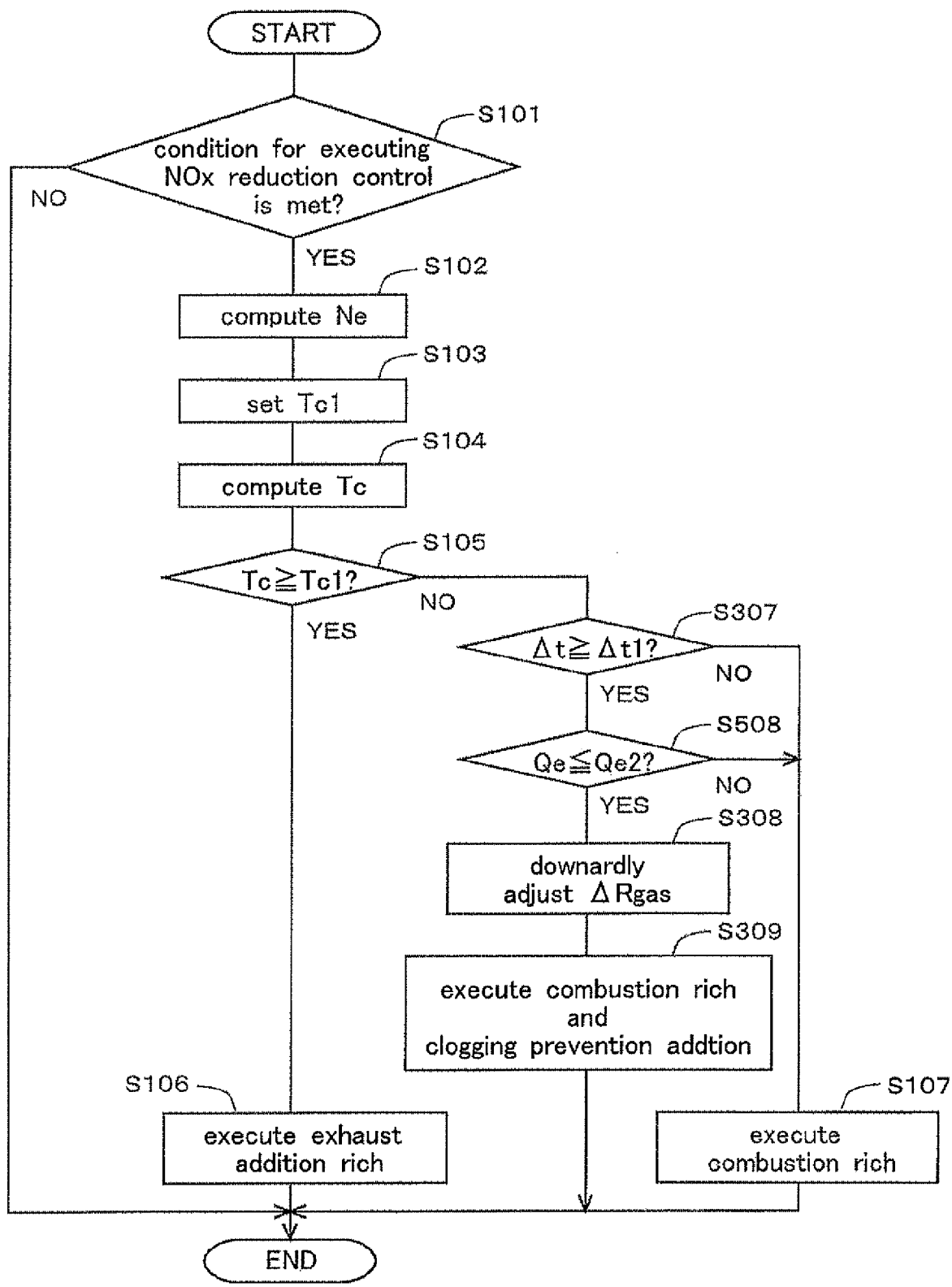
FIG. 7 is a flow chart of a routine of an NOx reduction control according to a second modification of embodiment 3.

In the following, a routine of the NOx reduction control according to this modification will be described with reference to the flow chart shown in FIG. 7. This routine is stored in the ECU 20 in advance and executed repeatedly at predetermined intervals while the internal combustion engine 1 is operating. The flow chart shown in FIG. 7 is the same as the flow chart shown in FIG. 5 except for the addition of step S508. Therefore, only step S508 will be described, and descriptions of the other steps will be omitted.

In this routine, if the determination in step S307 is affirmative, the ECU 20 proceeds to step S508. In step S508, the ECU 20 determines whether or not the engine load Qe of the internal combustion engine 1 is equal to or lower than the second specific load Qe2. If the determination in step S508 is affirmative, the ECU 20 proceeds to step S107, and if the determination is negative, the ECU 20 proceeds to step S308.

In this modification, in the case where the simultaneous execution of the clogging prevention addition with the combustion rich is disabled, the clogging prevention addition is performed after completion of the combustion rich.

The method of determination as to disabling of execution of the clogging prevention addition according to this modification may be applied to modification 2.

In the case where this modification is applied to the NOx reduction control according to embodiment 2, the second specific load Qe 2 is set to a value lower than the first specific load Qe1.

Embodiment 4

The general configuration of the internal combustion engine and its air-intake and exhaust system according to this embodiment is the same as that in embodiment 1. In this embodiment also, an NOx reduction control is performed in the same manner as that in embodiment 1.

<SOx Poisoning Recovery Control>

In this embodiment, an SOx poisoning recovery control for reducing SOx stored in the NOx catalyst 10 is performed. To reduce SOx stored in the NOx catalyst 10, it is needed to raise the temperature of the NOx catalyst 10 to a target temperature at which the reduction of SOx is possible and, in addition, to decrease the air-fuel ratio of the ambient atmosphere around the NOx catalyst 10 to a target SOx reduction air-fuel ratio at which the reduction of SOx is possible. To this end, in the SOx poisoning recovery control, a rich spike control in which the air-fuel ratio of the ambient atmosphere around the NOx catalyst 10 is decreased to the target SOx reduction air-fuel ratio repeatedly at relatively short intervals is performed. In this embodiment, the target SOx reduction air-fuel ratio corresponds to the second target air-fuel ratio according to the present invention.

When the air-fuel ratio of the ambient atmosphere around the NOx catalyst 10 is to be decreased to the target SOx reduction air-fuel ratio so as to reduce SOx stored in the NOx catalyst 10, the SOx reduction ratio is higher in the case where only the combustion rich is performed than in the case where the exhaust addition rich is performed irrespective of whether or not fuel can evaporate in the NOx catalyst 10. Here, the "SOx reduction ratio" refers to the ratio of the quantity of reduced SOx to the quantity of SOx stored in the NOx catalyst 10.

In view of the above, in this embodiment, when the SOx poisoning recovery control is to be executed, the air-fuel ratio of the ambient atmosphere around the NOx catalyst 10 is decreased to the target SOx reduction air-fuel ratio only by the combustion rich regardless of the temperature of the NOx catalyst 10 and the engine load of the internal combustion engine 1.

Thus, according to this embodiment, not only NOx can always be reduced efficiently in the NOx reduction control, but also SOx stored in the NOx catalyst 10 can be reduced efficiently in the SOx poisoning recovery control.

Figure 8:
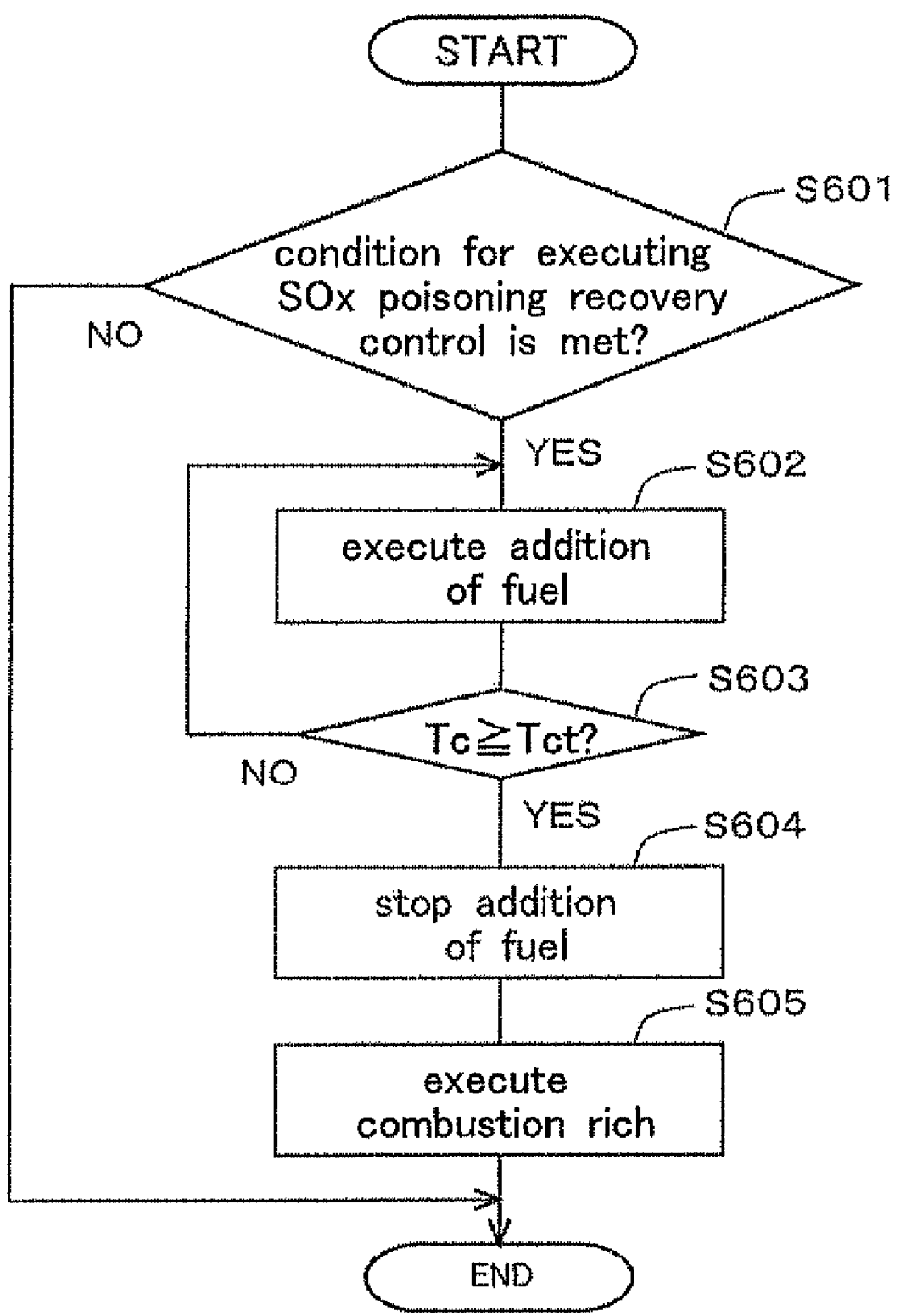
FIG. 8 is a flow chart of a routine of an SOx poisoning recovery control according to embodiment 4.

In the following, a routine of the SOx poisoning recovery control according to this embodiment will be described with reference to the flow chart shown in FIG. 8. This routine is stored in the ECU 20 in advance and executed repeatedly at predetermined intervals while the internal combustion engine 1 is operating. In this embodiment, the ECU 20 that executes this routine corresponds to the SOx reduction unit according to the present invention.

In this routine, first in step S601, the ECU 20 determines whether or not a condition for executing the SOx poisoning recovery control is met. Here, the condition for executing the SOx poisoning recovery control may be set based on the elapsed time since the last execution of the SOx poisoning recovery control, or the integrated amount of the injected fuel quantity in the internal combustion engine 1, as with the condition for executing the NOx reduction control. If the determination in step S601 is affirmative, the ECU 20 proceeds to step S602, and if the determination is negative, the ECU 20 once terminates execution of this routine.

In step S602, the ECU 20 executes the addition of fuel through the fuel addition valve 13. The addition of fuel is intended to increase the temperature of the NOx catalyst 10 to the target temperature Tct. The addition of fuel is performed intermittently. With the addition of fuel, the added fuel is supplied to the oxidation catalyst 9 and the NOx catalyst 10. When fuel is supplied to these catalysts as the air-fuel ratio of the exhaust gas is lean, the supplied fuel is oxidized in the catalysts. The temperature of the NOx catalyst 10 is increased by the heat of oxidation generated thereby.

Then, the ECU 20 proceeds to step S603, where it determines whether or not the temperature Tc of the NOx catalyst 10 has become equal to or higher than the target temperature Tct. If the determination in step S603 is affirmative, the ECU 20 proceeds to step S604, and if the determination is negative, the ECU 20 returns to step S602, where it continues to execute the addition of fuel through the fuel addition valve 13.

In step S604, the ECU 20 stops executing the addition of fuel through the fuel addition valve 13.

Then, the ECU 20 proceeds to step S605, where it executes the combustion rich to thereby decrease the air-fuel ratio of the ambient atmosphere around the NOx catalyst 10 to the target SOx reduction air-fuel ratio. Thereafter, the ECU 20 once terminates execution of this routine.

According to the above-described routine, after the temperature of the NOx catalyst 10 has been raised to be equal to or higher than the target to temperature, the air-fuel ratio of the ambient atmosphere around the NOx catalyst 10 is decreased to the target SOx reduction air-fuel ratio by the combustion rich. Therefore, SOx stored in the NOx catalyst 10 can be reduced more efficiently.

In the SOx poisoning recovery control according to this embodiment, if the temperature of the NOx catalyst 10 becomes lower than the target temperature during the execution of the combustion rich, the temperature of the NOx catalyst 10 may be raised again by once stopping the execution of the combustion rich and executes the addition of fuel through the fuel addition valve 13 again. In this case, the execution of the addition of fuel through the fuel addition valve 13 is stopped and the combustion rich is restarted when the temperature of the NOx catalyst 10 becomes equal to or higher than the target temperature again.

Although the temperature of the NOx catalyst 10 is raised by executing the addition of fuel through the furl addition valve 13 in this embodiment, the method of raising the temperature is not limited to this.

The above-described embodiments may be applied in any possible combination.

The invention claimed is:

1. An exhaust gas purification system for an internal combustion engine comprising:
   an NOx storage reduction catalyst provided in an exhaust passage of an internal combustion engine;
   a reducing agent addition unit provided in the exhaust passage upstream of said NOx storage reduction catalyst for adding reducing agent to exhaust gas;
   an exhaust gas air-fuel ratio control unit for controlling the air-fuel ratio of exhaust gas discharged from the internal combustion engine;
   an NOx reduction unit for reducing NOx stored in said NOx storage reduction catalyst by decreasing the air-fuel ratio of ambient atmosphere around said NOx storage reduction catalyst to a target air-fuel ratio; and
   a reducing agent evaporation determination unit for determining whether or not, if the reducing agent is added through said reducing agent addition unit, the reducing agent adhering to said NOx storage reduction catalyst can evaporate in said NOx storage reduction catalyst,
   wherein when reducing NOx stored in said NOx storage reduction catalyst, if a negative determination is made by said reducing agent evaporation determination unit, said NOx reduction unit decreases the air fuel ratio of ambient atmosphere around said NOx storage reduction catalyst to said target air-fuel ratio only by decreasing the air-fuel ratio of exhaust gas discharged from the internal combustion engine by said exhaust gas air-fuel ratio control unit, and if an affirmative determination is made by said reducing agent evaporation determination unit, said NOx reduction unit decreases the air fuel ratio of ambient atmosphere around said NOx storage reduction catalyst to said target air-fuel ratio either only by adding the reducing agent through said reducing agent addition unit, or by decreasing the air-fuel ratio of exhaust gas discharged from the internal combustion engine by said exhaust gas air-fuel ratio control unit and adding the reducing agent through said reducing agent addition unit,
   said reducing agent evaporation determination unit makes a negative determination if the temperature of said NOx storage reduction catalyst is lower than a specific temperature, and makes a positive determination if the temperature of said NOx storage reduction catalyst is equal to or higher than said specific temperature, and
   in the case where the engine rotational speed of the internal combustion engine at the time when NOx stored in said NOx storage reduction catalyst is to be reduced is high, said specific temperature is set to a value lower than that in the case where the engine rotational speed is low.

2. An exhaust gas purification system for an internal combustion engine according to claim 1, wherein said reducing agent evaporation determination unit makes a negative determination if the engine load of the internal combustion engine is lower than a first specific load, and makes an affirmative determination if the engine load of the internal combustion engine is equal to or higher than said first specific load.

3. An exhaust gas purification system for an internal combustion engine according to claim 2, wherein in the case where the engine rotational speed of the internal combustion engine at the time when NOx stored in said NOx storage reduction catalyst is to be reduced is high, said first specific load is set to a value lower than that in the case where the engine rotational speed is low.

4. An exhaust gas purification system for an internal combustion engine according to claim 1, further comprising a clogging prevention determination unit for determining whether or not a condition for executing clogging prevention addition, which is addition of reducing agent performed to prevent clogging of said reducing agent addition valve, is met, wherein if said condition for executing the clogging prevention addition is met at the time when NOx stored in said NOx storage reduction catalyst is to be reduced and a negative determination is made by said reducing agent evaporation determination unit, the air-fuel ratio of exhaust gas discharged from the internal combustion engine is decreased by said exhaust gas air-fuel ratio control unit, and said clogging prevention addition is performed, wherein the amount of decrease in decreasing the air-fuel ratio of the exhaust gas discharged from the internal combustion engine by the exhaust gas air-fuel ratio control unit in order to make the air-fuel ratio of ambient atmosphere around said NOx storage reduction catalyst equal to said target air-fuel ratio is made smaller as compared to that in the case where said clogging prevention addition is not performed.

5. An exhaust gas purification system for an internal combustion engine according to claim 4, wherein said clogging prevention determination unit determines that the condition for executing said clogging prevention addition is met when time elapsed since the last execution of said clogging prevention addition reaches a first specific time, and said clogging prevention determination unit also determines that the condition for executing said clogging prevention addition is met when time elapsed since the last execution of said clogging prevention addition has reached a second specific time shorter than said first specific time at the time when NOx stored in said NOx storage reduction catalyst is to be reduced.

6. An exhaust gas purification system for an internal combustion engine according to claim 4, wherein execution of said clogging prevention addition is disabled if the engine load of the internal combustion engine is equal to or lower than a second specific load, even if the condition for executing said clogging prevention addition is met at the time when NOx stored in said NOx storage reduction catalyst is to be reduced and a negative determination is made by said reducing agent evaporation determination unit.

7. An exhaust gas purification system for an internal combustion engine according to claim 1, wherein:
    said target air-fuel ratio is a first target air fuel ratio,
    the system further comprises an SOx reduction unit for reducing SOx stored in said NOx storage reduction catalyst by decreasing the air-fuel ratio of ambient atmosphere around said NOx storage reduction catalyst to a second target air-fuel ratio and raising the temperature of said NOx storage reduction catalyst to a target temperature, and
    when reducing SOx stored in said NOx storage reduction catalyst, said SOx reduction unit decreases the air-fuel ratio of ambient atmosphere around said NOx storage reduction catalyst to said second target air-fuel ratio only by decreasing the air-fuel ratio of exhaust gas discharged from the internal combustion engine by said exhaust gas air-fuel ratio control unit.

* * * * *